Aug. 17, 1937.  C. R. ANDERSON  2,090,604
STOVE DAMPER
Filed Aug. 12, 1935

Carl R. Anderson
INVENTOR.

BY
ATTORNEYS.

Patented Aug. 17, 1937

2,090,604

UNITED STATES PATENT OFFICE 2,090,604

STOVE DAMPER

Carl R. Anderson, Erie, Pa., assignor to The Griswold Manufacturing Company, Erie, Pa., a corporation of Pennsylvania Application August 12, 1935, Serial No. 35,782

3 Claims. (Cl. 126—292)

This invention is in the nature of an improvement on the type of damper illustrated in the patent to Massing, No. 1,146,807, July 20, 1915. In the Massing patent, the loop having the locking surfaces for effecting the locking of the damper rod is arranged directly at the edge of the damper plate. By reason of this, the locking shoulder may be obstructed by the outer edge of the loop just at the time when the point of the damper is being formed through the wall of the pipe. In the present invention, the locking loop is arranged farther in from the outer edge of the plate. One of the reasons for utilizing a loop inwardly from the edge is that it permits the passage of the shoulder through the incoming side of the pipe and into the damper rod passage of the plate prior to the forcing of the point through the outgoing side of the pipe. This inwardly locking loop gives greater strength to the locking engagement than the loop at the outer edge.

Features and details of the invention will appear from the specifications and claims.

Figure 1:
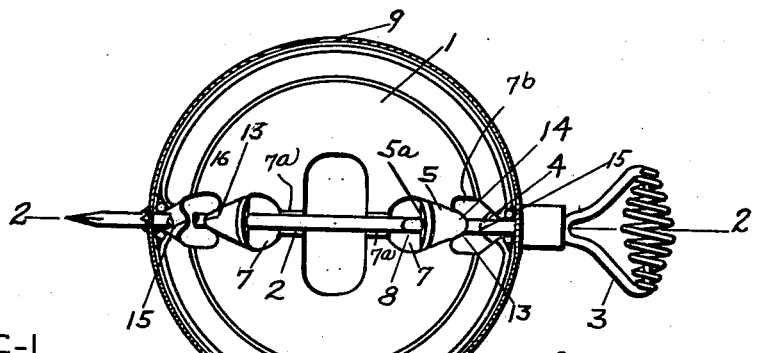

A preferred embodiment of the invention is illustrated in the accompanying drawing as follows:

Fig. 1 shows a plan view of the damper.

Figure 2:
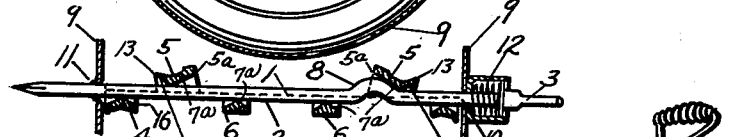

Fig. 2 a section on the line 2—2 in Fig. 1.

Figure 3:
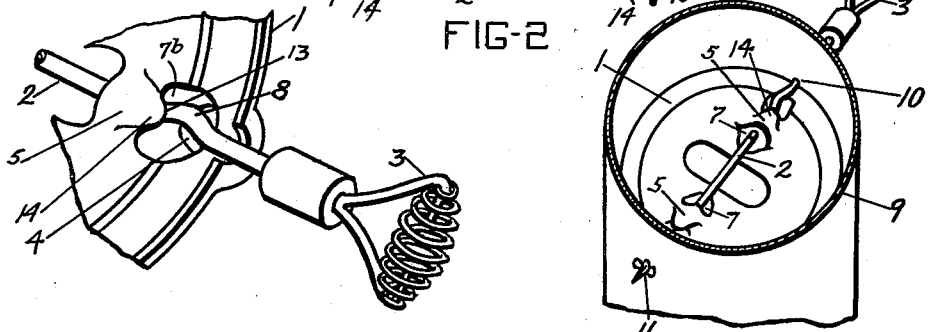

Fig. 3 a perspective view showing the damper rod shoulder at an intermediate position in the damper plate.

Figure 4:
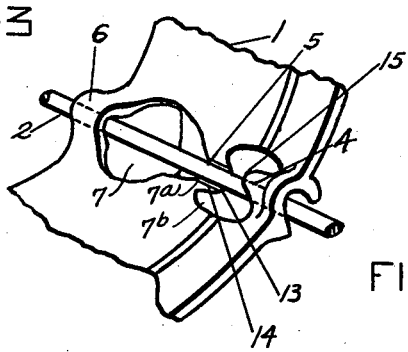

Fig. 4 a similar view to that of Fig. 3 with the damper plate reversed.

Figure 5:
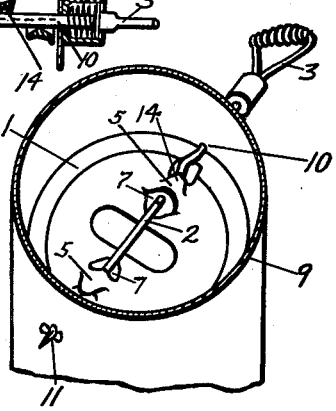

Fig. 5 a perspective view showing the damper in place in a pipe and with the rod in an intermediate position.

1 marks the damper plate, 2 the damper rod, 3 the handle for the rod, 4, 5 and 6 alternately faced loops, the concave surfaces in the loops forming the damper rod passage 7a of the damper plate. 8 is a locking shoulder on the rod 2, this shoulder being formed by a sharp bend in the rod. The damper is placed in a pipe 9, the rod forced through the wall of the pipe making the opening 10 at the ingoing side of the pipe and the opening 11 at the outgoing side of the pipe. The damper rod is usually pointed as shown to facilitate forcing the rod through the pipe.

The shoulder 8 as it passes the first loop, must be given a half turn, so that it may pass through the open side of the second loop, or locking loop 5. The damper is provided with an enlargement of the passage 7a to permit the turning of the shoulder. As shown this enlargement is formed by an opening 7b extending entirely through the plate. After the rod has passed the locking loop, it is again given a half turn, which brings the shoulder opposite a locking surface 5a in the locking loop. In order that the shoulder may be turned after passing the locking loop, the rod passage 7a is enlarged at 7 in order to permit the shoulder to turn. As shown the enlargement 7 is in the form of an opening extending entirely through the plate. The rod is then retracted bringing the shoulder into engagement with the locking surface, so as to lock the plate with the rod. This retracted movement is accomplished by spring 12. So far as described, except that the locking loop is the second loop in from the edge, it is similar to the general type disclosed in the Massing patent. The loops at opposite edges of the damper correspond, so that the rod may be entered from either edge of the damper plate and locked in the manner of the Massing patent, if desired.

As the rod emerges from the loop 4, the shoulder 8 must be given a half turn to clear the loop 5. It will be understood that the damper at this time is inside of the pipe and not readily observable. In order to assist the operator in making the half turn, I have provided the guiding projection 13 on the incoming or outer edge of the loop 5. This projection has the guiding surface 14 which, when engaged by the shoulder 8 tends to rotate the rod as it is pressed inwardly. Without such camming action and with a direct engagement with the shoulder 8 with the incoming edge of the loop 5, the operator is apt to become confused and have trouble in completing the insertion of the rod. Similarly, on a return movement of the rod, there may be confusion by the engagement of the shoulder 8 with the outgoing or inner edge of the loop 4 and I therefore provided the inner edge of that loop with a guiding projection 15, having the guiding surface 16 operating in the manner of the guiding projection 13.

What I claim as new is:

1. In a stove damper the combination of a damper rod having a shoulder; and a damper plate formed with a pair of radially spaced loops forming a rod-receiving passage along the plate, the first of said loops being nearer the rod-receiving end of the passage and the second of said loops being more remote from the rod-receiving end of the passage, the second of said loops having a locking surface facing away from the entrance end of the passage, said plate having a free space between the loops and adjacent the locking surface permitting the turning of the shoulder of the damper rod, the edge of the second loop facing the entrance end of the passage having a guiding surface constructed to engage the incoming shoulder and assist in turning the shoulder toward the open side of the loop.

2. In a stove damper, the combination of a damper rod having a shoulder; and a damper plate formed with a pair of radially spaced loops forming a rod-receiving passage along the plate, the first of said loops being nearer the rod-receiving end of the passage and the second of said loops being more remote from the rod-receiving end of the passage, the second of said loops having a locking surface facing away from the entrance end of the passage, said plate having a free space between the loops and adjacent the locking surface permitting the turning of the shoulder of the damper rod, the edge of the second loop facing the entrance end of the passage having a projection with inclined sides forming guiding surfaces adapted to engage the incoming shoulder and assist in turning the shoulder toward the open side of the loop.

3. In a stove damper, the combination of a damper rod having a shoulder; and a damper plate formed with a pair of radially spaced loops forming a rod-receiving passage along the plate, the first of said loops being nearer the rod-receiving end of the passage and the second of said loops being more remote from the rod-receiving end of the passage, the second of said loops having a locking surface facing away from the entrance end of the passage, said plate having a free space between the loops and adjacent the locking surface permitting the turning of the shoulder of the damper rod, the edge of the first loop facing away from the entrance of the passage having a guiding surface adapted to engage an outgoing shoulder and assist in turning the shoulder toward the open side of the loop.

CARL R. ANDERSON.